United States Patent
Bianculli et al.

(10) Patent No.: US 9,696,770 B2
(45) Date of Patent: Jul. 4, 2017

(54) FLEXIBLE TIER DATA CENTER

(75) Inventors: Barry Bianculli, Los Banos, CA (US);
Norman Holt, Oakley, CA (US);
Jeremy Immel, San Jose, CA (US);
Scott Noteboom, San Jose, CA (US);
Albert Dell Robison, Los Gatos, CA (US); Jesus Suarez, Los Gatos, CA (US)

(73) Assignee: YAHOO! INC., Sunnyvale, CA (US)

( * ) Notice: Subject to any disclaimer, the term of this patent is extended or adjusted under 35 U.S.C. 154(b) by 1019 days.

(21) Appl. No.: 13/415,804

(22) Filed: Mar. 8, 2012
(Under 37 CFR 1.47)

(65) Prior Publication Data
US 2013/0120929 A1 May 16, 2013

Related U.S. Application Data

(60) Provisional application No. 61/450,980, filed on Mar. 9, 2011.

(51) Int. Cl.
*H02J 7/00* (2006.01)
*H02J 9/00* (2006.01)
*G06F 1/20* (2006.01)
*G06F 1/18* (2006.01)

(52) U.S. Cl.
CPC .......... *G06F 1/20* (2013.01); *G06F 1/189* (2013.01)

(58) Field of Classification Search
CPC .......... G06F 1/20; G06F 1/189; G06F 1/3287; H02J 1/10; H02J 9/06; Y10T 307/615

USPC .................................................. 307/64–66
See application file for complete search history.

(56) References Cited

U.S. PATENT DOCUMENTS

| | | | |
|---|---|---|---|
| 6,191,500 B1* | 2/2001 | Toy | H02J 3/46 307/64 |
| 6,433,444 B1* | 8/2002 | de Vries | H02J 1/10 307/64 |
| 7,514,815 B2* | 4/2009 | Paik | H02J 3/14 307/64 |
| 2005/0200205 A1* | 9/2005 | Winn | H02J 9/062 307/64 |
| 2006/0143289 A1* | 6/2006 | Smith | H04L 67/34 709/224 |
| 2007/0046103 A1* | 3/2007 | Belady et al. | 307/12 |
| 2011/0304211 A1* | 12/2011 | Peterson et al. | 307/48 |
| 2011/0307113 A1* | 12/2011 | Kumar | B60M 3/00 700/291 |
| 2011/0316337 A1* | 12/2011 | Pelio et al. | 307/24 |
| 2012/0110350 A1* | 5/2012 | Horvath | G06F 1/263 713/300 |
| 2012/0181869 A1* | 7/2012 | Chapel et al. | 307/64 |

* cited by examiner

*Primary Examiner* — Rexford Barnie
*Assistant Examiner* — Rasem Mourad
(74) *Attorney, Agent, or Firm* — Cooper Legal Group, LLC

(57) ABSTRACT

A server cooling system includes: a flex-switch with one or more flexible building bridges; one or more utility farms coupled with the flex-switch; a power distribution unit operably connected to the flex-switch; and a server POD including one or more racks operably connected to the power distribution unit. The flex-switch is configurable to include additional utility farms, one or more generator farms, and one or more UPS farms.

20 Claims, 28 Drawing Sheets

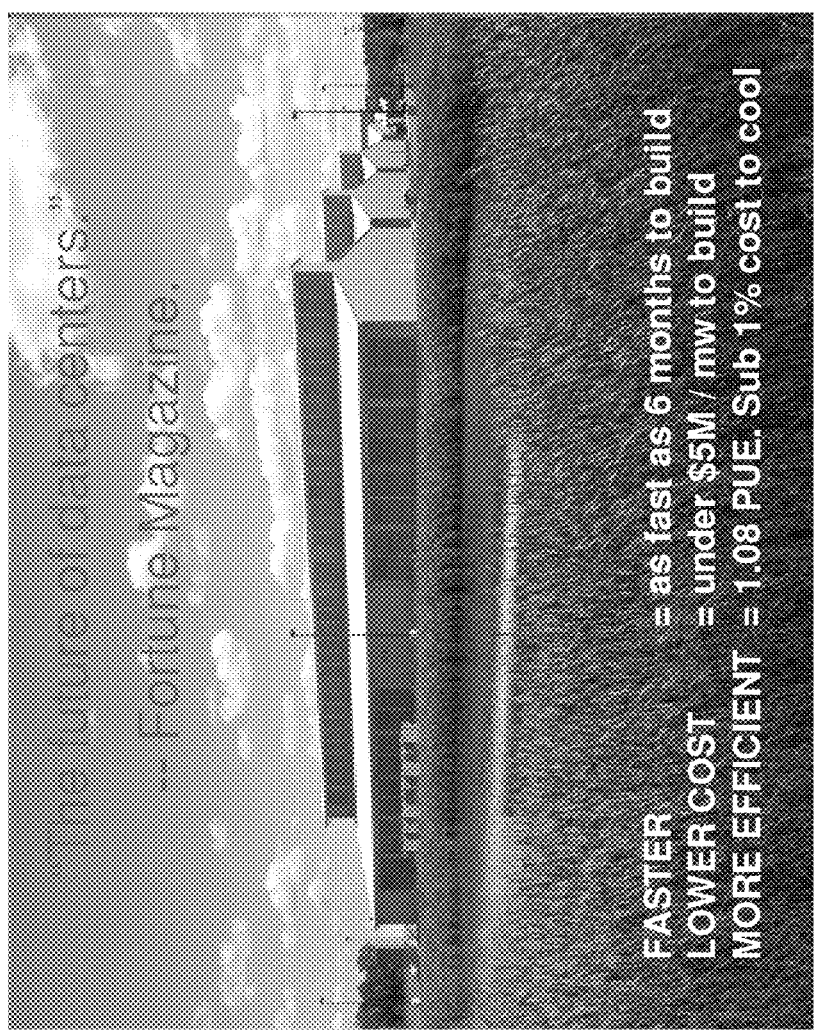
FIG. 9

Strategic Data Factory Locations Pay Off:

2 to 35x cost savings seen in strategic versus legacy locations.

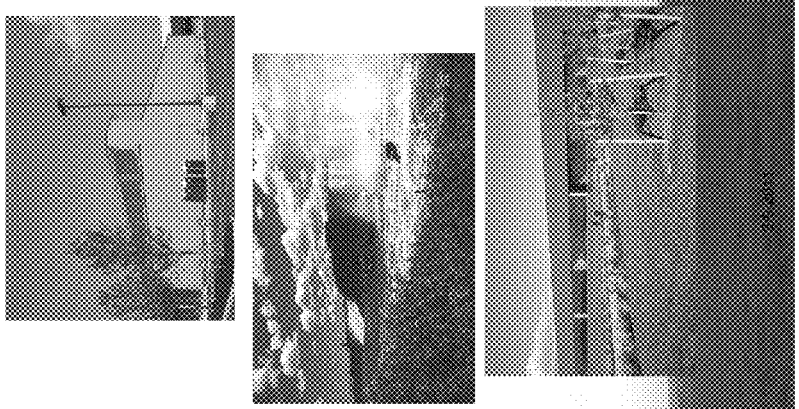

| Attribute | Legacy Location | Unnamed Better Location | Savings Potential at 20mw |
|---|---|---|---|
| Property Tax | 1% | Multi year tax waiver | Millions per yr. |
| Sales Tax | Up to 10% | None | Tens of millions per yr. |
| Land | $1M / acre | $8000 / acre | Tens of millions |
| Low cost power | >21 cents / kwh | <.02 cents / kwh | Tens of millions per yr. |
| Clean power | Coal, Oil | Wind, Solar, Hydro | Less / no carbon offsets. Cleaner world |
| Affordable, productive workforce to revitalize | More delivers less | Less delivers more | Millions / yr + happier / more productive employees |
| Cool climate for economization | Closed box data center bubble | Outside air economization | Millions in power savings. Millions of gallons of water & sewer savings |

FIG. 10

The Bottom Line: Green for the Money.

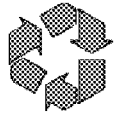 SPEND PAPER: We are currently investing over a half billion dollars building high efficiency data centers in strategic locations on 3 continents.

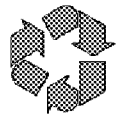 SAVE PAPER: Payback periods through operational savings, for these long term capital investments, is within 3 years.

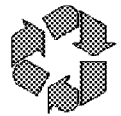 MAKE PAPER: At our scale, compared to the "tried and true" (a nicer words for "legacy," which is a nicer word for "outdated,") our efforts create operations savings of several hundred million dollars per year.

Yep, our data farms are GREEN

Yahoo! Presentation, Confidential

Yet Green for the Environment Too....

The difference between the EPA defined industry average legacy data center and the YICC design in upstate NY:

- 1.92 EPA average "PUE" rating versus Y! 1.08
- Sub 1% annualized avg cost to cool (versus ~40%)
- Saves us $16M electricity usage per year: Enough juice to power over 18,000 homes.
- Saves over 75 Million gallons of water usage per year: More water than flows over the Niagara Falls, 2 min straight.
- Saves over 15 Million gallons of sewer discharge per year: More sewage than would fill 24 Olympic swimming pools.
- Lower Cost (under $5M/mw.) Faster to Build (6 mo.) More Efficient (1.08 PUE)

Recognition: 100's of positive press coverage; Won $10M innovation grant; Will be featured in 2011 PBS documentary; #9 Newsweek "green company."

FIG. 13

FIG. 15

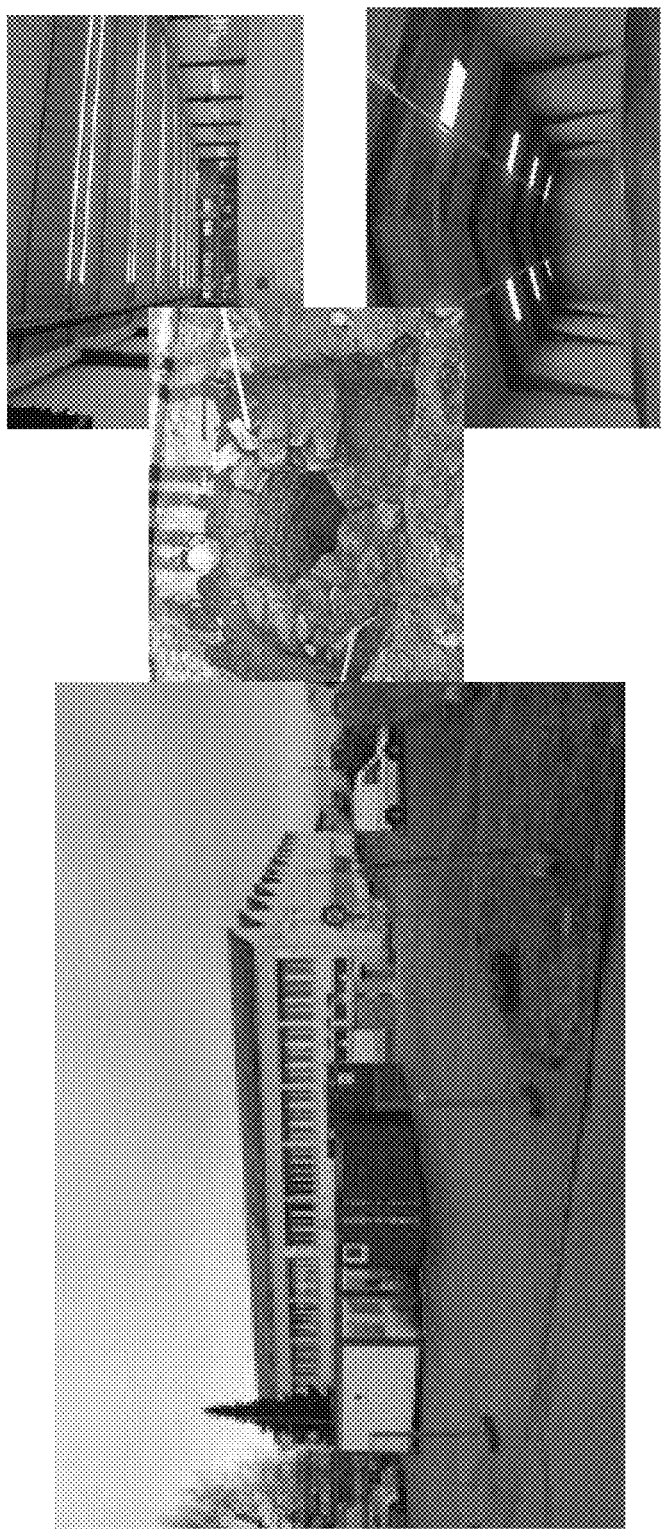
FIG. 18

Yahoo's Focus on Tuning our PUE Curves:

- Designing systems to accommodate incremental turn up, versus legacy "commission 100% and leave it."

- Smaller increment or variable operation of systems to support more efficient incremental scale.

- Pre-emptive creation of curves better helps project power costs and usage requirements.

- Ongoing measurement versus curves present operating goals for team to accomplish.

- 20% improvement through focus on design; >10% improvement just being an area of focus.

Yahoo! Presentation, Confidential

FIG. 20

Separating "Pre-" from "Construction"

- Typical legacy end-to-end data center development projects can take anywhere for 12 months to 3 years to complete.
- Data center capacity plans, which normally drive construction, get less reliable and are more susceptible to change the longer out they go.
- Longer build cycle = unreliability of longer capacity plan + need to build more idle capacity to accommodate time to build.
- Stranded, idle data center capacity creates a less optimal PUE curve and is the equivalent of having an idle factory.

THIS IS WHY BUILDING FASTER SAVES US MONEY

FIG. 21

Separating "Pre-" from "Construction"

<u>Typical "Pre-Construction" activities include:</u>

- Site Selection Due Diligence
- Governmental negotiations          TIME COST = HIGHER
- Land purchase
- Utility service Infrastructure     MONETARY COST = LOWER
- Data Center Design
- Permitting

- Can typically take from 6-24 months to complete.
- Many times, the most unpredictable and most likely to slip.
- Can normally take just as long, if not longer than the construction.
- Yet, pre-construction is typically a small percentage of total project costs.

FIG. 22

Separating "Pre-" from "Construction"

- Yahoo has had success building and validating the business case that, done right, pre-emptive data center pre-construction activities should occur separately and pre-emptive from data center construction cycle itself.

- Small investment during long, unpredictable timeframe saves more money and time in project overall.

- This is the main driver that allows Yahoo! to successfully accomplish sub 6 month build cycles.

- This allows us to only have to rely on a sub 1 year capacity plan, which is typically much more reliable than longer versions. This too has shown to save money.

FIG. 23

Yahoo's Focus on Next Generation UPS:

- Smaller increments, that install when the servers install and only operate when server cabinets are operating. Saves power and upfront cost.

- UPS integrated into cabinets in ZERO U-space.

- Higher voltage input (480VAC) to avoid 1-3% loss during transformation to 208VAC. DC voltage DC output to avoid losses through multiple AC to DC to AC conversions. 25% savings in power efficiency versus legacy UPS->PDU->Standard Server PS solution.

- Service free with 3-4 year lifecycle (>1000 discharge spec. 1-3 min standby.) No service costs. Easy to swap upon failure.

- Less than ½ the installed cost of legacy UPS solutions.

LEGACY UPS SOLUTIONS ARE ON DEATH ROW.
THEY MUST EVOLVE TO SURVIVE.

FIG. 25

Yahoo's Focus on Next Generation UPS:

To take things a step further....

- The best way to avoid UPS cost, complexity and problems is to avoid UPS in the places where you can.
- The best way to increase UPS uptime is to increase redundancy and resiliency where you can.

Introducing Yahoo!'s next generation design....

The Y! Flex Tier Data Factory.

COMING SOON

Traditional Data Center Tier Benchmarks

Industry Standard Benchmarks for Data Center Design:

- Tier I: composed of a single path for power and cooling distribution, without redundant components, providing 99.671% availability. $3.5-10M/mw
- Tier II: composed of a single path for power and cooling distribution, with redundant components, providing 99.741% availability. $4-12M/mw
- Tier III: composed of multiple active power and cooling distribution paths, but only one path active, has redundant components, and is concurrently maintainable, providing 99.982% availability. $5-15M/mw
- Tier IV: composed of multiple active power and cooling distribution paths, has redundant components, and is fault tolerant, providing 99.995% availability. $15-22+M/mw All too often inputs used to determine tier selected for data center build......

1) Uptime requirement for most critical applications housed in facility.
More often than not, that means we'd all like Tier 4.

2) Budget requirements for the project.
Unless you've got major money, many times our Tier 4 determined in step 4 becomes a Tier 2 or 3 after we have to consider budget ☺

Yahoo has always been creative in building data centers: "well.... kinda Tier 3, but with some aspects of Tier 2 and Tier 4." However, we'd always built sites to a single tier, and "kinda" met the needs of everything– at a cost.

FIG. 27

Utility Computing Requires Thinking Outside the Traditional Tier Box...

*Single Tier Data Center Sites Aren't Cutting it Anymore...*

- Geographic replication of virtualization and/or cloud/grid computing functions is creating a higher percentage of total applications that can run at LOWER tiers. Examples: Y! Archive Mail; Y! Grid

- At the same time, the same emerging technologies create a small percentage of applications that demand even HIGHER tiers. Examples: Y! Core Network & DC Tools; Y! Mail Registration Farms.

Thus, a single data center based on a legacy tier design isn't optimal. This is why we're focusing on the Y! Flex Tier Data Center...

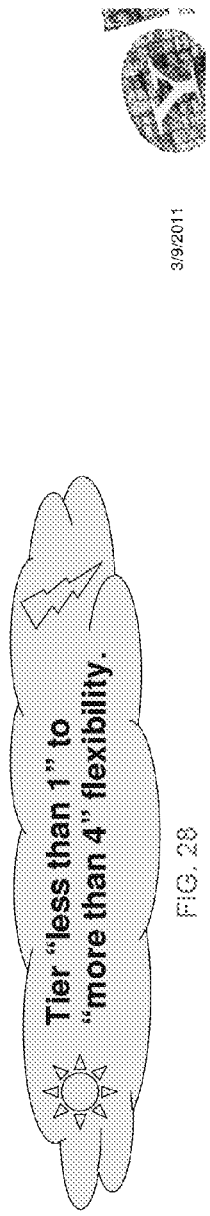

FIG. 28

FLEXIBLE TIER DATA CENTER

CROSS-REFERENCE TO RELATED APPLICATIONS

This application is a non-provisional of, and claims priority from, U.S. Provisional Patent Application No. 61/450,980, filed on Mar. 9, 2011.

FIELD OF THE INVENTION

The present disclosure relates generally to flexible tier data centers and in one example for a data center that is scalable and configurable for various availability requirements.

BACKGROUND OF THE INVENTION

The rise of cloud computing wherein services and storage are provided over the Internet enables providing shared resources, software, and information to desktop computers, mobile devices and other devices on demand. Server virtualization enables partitioning one physical server computer into multiple virtual servers. Each virtual server appears to be the same as a physical server and is capable of functioning as a full-fledged server. The combination of cloud computing and server virtualization is powerful in supplying on-demand computing utility and is flexible in efficiently allocating computing resources.

A cloud-computing ready data center requires computing, storage, and communication resources to be efficiently allocated and expanded at a large scale. The data center has to be operating without interruption or with certain guaranteed availability. The availability requirement of applications hosted in a data center may change over time. For example, the geographic replication of server virtualization provides duplicate hardware and software replication in two or more geographic areas which ensures a high rate of availability in a wide variety of situations that disrupt normal business operations. The availability requirement may be relaxed for any one particular data center that houses servers which provide geographic replication of server virtualization within the two or more geographic areas. The data center may need to adapt to the cloud computing and server virtualization environment in a scalable, configurable and efficient manner.

The Uptime data center tier standards, developed by the Uptime Institute, are a standardized methodology used to determine availability in a data center. The tiered system provides a measure for return on investment (ROI) and performance of a data center. The standards comprise a four-tiered scale, with Tier 4 being the most robust, and Tier 1 being the least robust.

In a Tier 1 data center, a single and non-redundant distribution path is used to serve the computing servers, the storage servers and other equipment in a data center. There are no non-redundant capacity components. The cost of a Tier 1 data center may be $3.5 million to $10 million per MW. The guaranteed availability of a Tier 1 data center is 99.671%.

In a Tier 2 data center, in addition to all Tier 1 data center requirements, there are redundant site infrastructure capacity components guaranteeing 99.741% availability. The cost of a Tier 2 data center may be $4 million to $12 million per MW.

In a Tier 3 data center, in addition to all Tier 2 data center requirements, there are multiple independent distribution paths serving the computing servers, the storage servers and other equipment in a data center. All of the servers and other equipment are dual-powered and there are redundant capacity components. The cost of a Tier 3 data center may be $5 million to $15 million per MW. The guaranteed availability of a Tier 3 data center is 99.982%.

In a Tier 4 data center which is considered the most robust and less prone to failures, in addition to all Tier 3 requirements, all components are fully fault-tolerant including redundant capacity components, storage, chillers, Heating, Ventilation, Air Conditioning (HVAC) systems, servers, etc. Everything is dual-powered. The cost of a Tier 4 data center may be over $22 million per MW. The guaranteed availability of a Tier 4 data center is 99.995%.

Tier 4 data centers are designed to host mission critical servers and computer systems, with fully redundant subsystems (cooling, power, network links, storage, etc.) and compartmentalized security zones controlled by biometric access control methods. On the other hand, Tier 1 data centers are least robust but least expensive and may be suitable for less critical applications.

Typical end-to-end data center development projects can take anywhere for twelve months to three years to complete. Data center capacity plans, which normally drive construction, get less reliable and are more susceptible to change. Shorter build cycles of a data center saves costs. Longer build cycles, however, may cause unavailability of longer capacity plan. It may also be necessary to build more idle capacity to accommodate time to build. Stranded and idle data center capacity creates a less optimal Power Usage Effectiveness (PUE) curve and is the equivalent of having an idle factory. The PUE metric compares a facility's total power usage to the amount of power used by the IT equipment, revealing how much is lost in distribution and conversion. An average PUE of 2.0 indicates that the IT equipment uses about 50 percent of the power to the building.

Typical Pre-Construction activities of building a data center include site selection due diligence, governmental negotiations, land purchase, utility service infrastructure, data center design, and obtaining permits. The activities typically take from six to twenty-four months to complete. However, often times, the progress of the Pre-Construction activities may be unpredictable and the schedule may slip. The duration of the Pre-Construction activities normally takes just as long, if not longer than the construction time of a data center. The cost of the Pre-Construction activities, however, is typically a small percentage of the total project cost.

Uninterruptible Power Supply (UPS) is typically used to protect servers and other electrical equipment in a data center where an unexpected power disruption could cause injuries, fatalities, serious business disruption or data loss. UPS units range in size from units designed to protect a single computer to large units powering entire data centers, buildings, or even cities. Battery technology has been improving and is enabling more compact, more efficient, longer lifecycle, and service free batteries that may be used in UPS systems. With the advancement of battery technology, it may be possible to have smaller UPS units that install when the servers install and only operate when servers on server racks are operating. The smaller UPS units save power and upfront cost. The smaller UPS units may be integrated into racks in 0 U space. The smaller UPS units may also have higher voltage input (480 VAC) to avoid 1% to 3% loss during transformation to 208 VAC. Compared with the standard configuration wherein an UPS system is coupled with a Power Distribution Unit (PDU) which supplies power to server racks, a 25% savings in power efficiency may be achieved. Smaller UPS units with advanced battery technology may be service free within the 3 to 4 year lifecycle. There will be no service costs and it is easy to swap upon failure. The cost may be less than one half of the installed cost of standard UPS solutions for a data center.

Servers are typically placed in racks in a data center. There are a variety of physical configurations for racks. A typical rack configuration includes mounting rails to which multiple units of equipment, such as server blades, are mounted and stacked vertically within the rack. One of the most widely used 19-inch rack is a standardized system for mounting equipment such as 1 U or 2 U servers. One rack unit (1 U) space on this type of rack typically is 1.75 inches high and 19 inches wide. A rack-mounted unit that can be installed in one rack unit is commonly designated as a 1 U server. In data centers, a standard rack is usually densely populated with servers, storage devices, switches, and/or telecommunications equipment. While the performance of servers is improving, the power consumption of servers is also rising despite efforts in low power design of integrated circuits. For example, one of the most widely used server processors, AMD's Opteron processor, runs at up to 95 watts. Intel's Xeon server processor runs at between 110 and 165 watts. Processors are only part of a server, however; other parts in a server such as storage devices consume additional power.

Rack-mounted units may comprise servers, storage devices, and communication devices. Most rack-mounted units have relatively wide ranges of tolerable operating temperature and humidity requirements. For example, the system operating temperature range of the Hewlett-Packard (HP) ProLiant DL365 G5 Quad-Core Opteron processor server models is between 50° F. and 95° F.; the system operating humidity range for the same models is between 10% and 90% relative humidity. The system operating temperature range of the NetApp FAS6000 series filers is between 50° F. and 105° F.; the system operating humidity range for the same models is between 20% and 80% relative humidity.

The power consumption of a rack densely stacked with servers powered by Opteron or Xeon processors may be between 7,000 and 15,000 watts. As a result, server racks can produce very concentrated heat loads. The heat dissipated by the servers in the racks is exhausted to the data center room. The heat collectively generated by densely populated racks can have an adverse effect on the performance and availability of the equipment installed in the racks, since they rely on the surrounding air for cooling.

A typical data center consumes 10 to 40 megawatts of power. The majority of energy consumption is divided between the operation of servers and HVAC systems. HVAC systems have been estimated to account for between 25 to 40 percent of power use in data centers. For a data center that consumes 40 megawatts of power, the HAVC systems may consume 10 to 16 megawatts of power. Significant cost savings can be achieved by utilizing efficient cooling systems and methods that reduce energy use.

The cost of building an efficient data center normally is high. A data center that is able to provide flexible availability tier configurations and is able to adapt to the cloud computing and server virtualization environment in a scalable, configurable and efficient manner may provide significant energy and other cost savings.

SUMMARY OF THE INVENTION

Briefly, according to an embodiment of the invention a server cooling system includes: an inside space defined by a floor, one or more lateral walls, and a roof; a flex-switch with one or more flexible building bridges; one or more utility farms coupled with the flex-switch; a power distribution unit operably connected to the flex-switch; and a server POD, installed in the inside space, including one or more racks operably connected to the power distribution unit. The flex-switch is configurable to include additional utility farms, one or more generator farms, and one or more UPS farms after construction of the server cooling system is completed.

According to another embodiment of the present invention, a data center includes: a flex-switch including one or more flexible building bridges; one or more utility farms coupled with the flex-switch; one or more generator farms coupled with the flex-switch; one or more UPS farms coupled with the flex-switch; and a server POD coupled with the flex-switch and a cabinet UPS. The flex-switch is configurable to include additional utility farms, additional generator farms, and additional UPS farms after construction of the data center is completed.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIGS. 8 through 28 are slides from a presentation detailing the benefits of the flexible tier data center.

Figure 1:
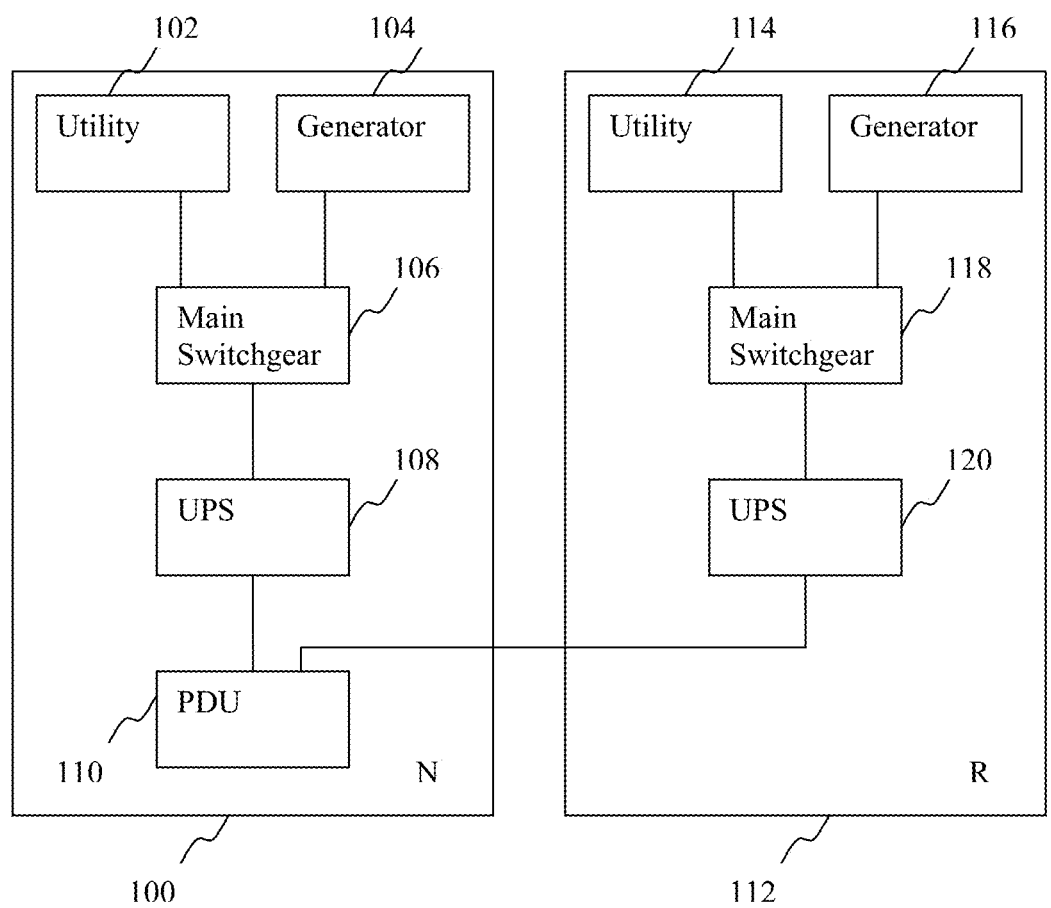
FIG. 1 is a diagram showing an example N+1 electrical power system in a data center.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

The following example embodiments and their aspects are described and illustrated in conjunction with apparatuses, methods, and systems which are meant to be illustrative examples, not limiting in scope.

FIG. 1 illustrates an example N+1 electrical power system in a data center. N+1 means that if the electrical power load can be supplied by N modules, the installation will contain at least N+1 electrical power modules wherein the +1 module acts as an independent backup component. The backup component may not actively participate in the normal system operation. In FIG. 1, module 100 provides electrical power to server racks housing servers and other equipment in a data center. Electrical power utility 102 and a power generator 104 are coupled with a main switchgear 106. In some embodiments, local electrical power utility is supplying electrical power to the main switchgear 106. In some other embodiments, the electrical power utility may not be available and the generator 104 may be turned on to supply power to the main switchgear 106. In some embodiments, the generator 104 may be powered by gasoline or diesel. The main switchgear 106 is coupled with an UPS system 108 which is coupled with a Power Distribution Unit (PDU) 110. The PDU 110 distributes power to server racks and the servers and other equipment on the server racks.

Module 112 acts as the +1 backup module. In some embodiments, the module 112 is in standby mode and does not participate in normal system operation. When the module 100 becomes unavailable, the module 112 immediately turns on to ensure continuous operation of the data center. Module 112 comprises an electrical power utility 114, a generator 116, and a main switchgear 118 and an UPS system 120. In some embodiments, the electrical power utility 114 supplies power to the main switchgear 118. The UPS system 120 is coupled with the main switchgear 118 and the PDU 110. In some embodiments, there may be one or more control units operable to monitor and detect when the module 100 becomes unavailable and to switch the module 112 from the standby mode to the operational mode to ensure normal data center operation. In some other embodiments, for every five modules 100, there is a redundant module 112. The single redundant module 112 may provide redundancy to five modules 100.

A single tier data center is increasingly becoming less flexible. Most of the time, a single tier data center is determined by the requirements of the most critical software applications hosted in the data center. For example, in a Yahoo! Inc. data center, critical applications such as Yahoo! Mail registration require Tier 4 or even higher availability, while applications such as Yahoo! Mail archives require Tier 1 or even lower availability. Server virtualization and cloud computing are creating a higher percentage of total applications that can run at lower tiers because geographic replication of virtualization provides redundancy and failover of servers. If critical applications such as Yahoo! Mail registration and applications such as Yahoo! Mail archives are hosted in a single data center, the availability requirement of the data center is determined by the requirement of the critical applications even though the critical applications may comprise a small percentage of applications hosted in the data center. The cost of the data center may be unnecessarily high due to the requirement of a small percentage of critical applications since the cost of a Tier 4 data center is significantly higher than a Tier 1 data center.

The applications hosted in a data center may also change over time. For example, Yahoo! Inc. is partnering with Microsoft Corporation on Web search and is no longer maintaining a Web search infrastructure. The Yahoo! Data centers that used to host Yahoo! Web search infrastructure are now being used for other applications such as Yahoo! Mail. The availability requirement of Yahoo! Web search and Yahoo! Mail may be different. The changing availability requirement of software applications over time calls for a flexible tier data center that is scalable and configurable.

A flexible tier data center may be able to solve the problem of a small percentage of critical applications dominating the availability requirement of a data center. The flexibility makes one single data center adaptable, scalable and configurable depending on the needs of the applications hosted in the data center. When the hosted applications change over time in the data center and the availability requirements change, the data center may be reconfigured to adapt to the changing requirements. When the number of hosted applications increases, the data center may be scaled and configured to handle the additional availability requirements.

Figure 2:
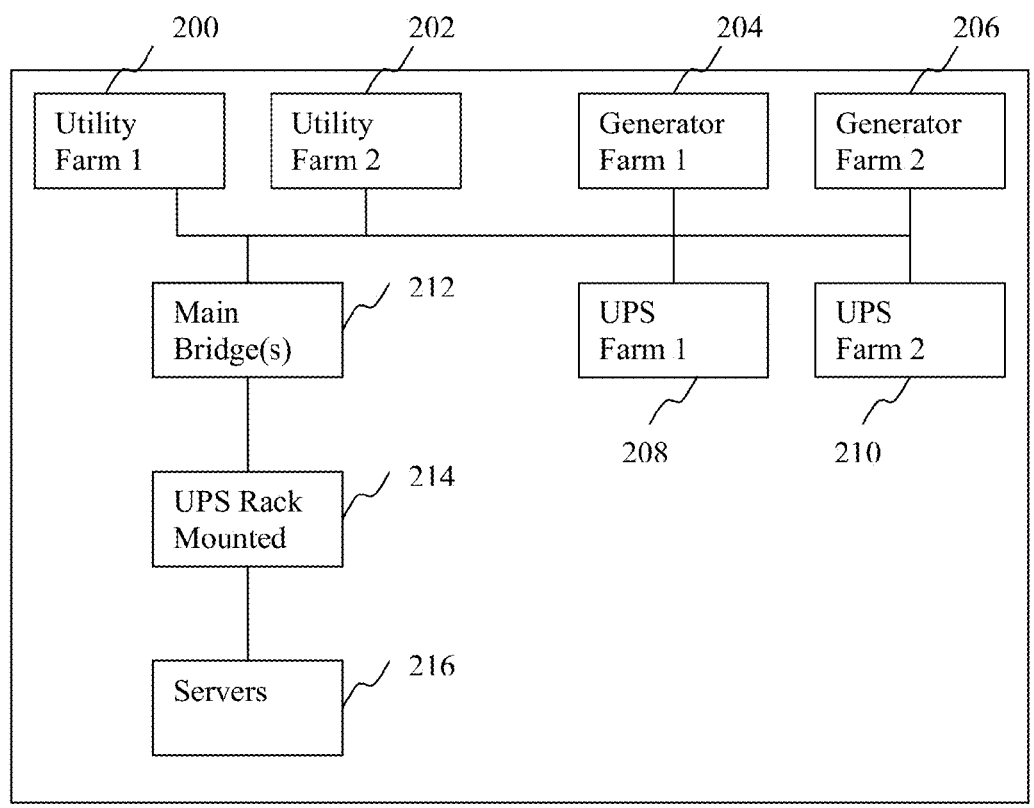
FIG. 2 is a diagram showing an example flexible tier data center.

FIG. 2 illustrates an example flexible tier data center comprising an electrical utility farm 200, a redundant utility farm 202, a generator farm 204, a redundant generator 206, an UPS farm 208, and a redundant UPS farm 210. The utility farm 200 and 202, the generator farm 204 and 206, and the UPS farm 208 and 210 are coupled with the main bridges 212. The UPS 214 may be mounted on the server racks and provides uninterruptible power supply to the servers and other equipment placed on the server racks. In some embodiments, the utility farm 200 and 202, the generator farm 204 and 206, and the UPS farm 208 and 210 may be reconfigured through plug-in sockets. In some other embodiments, one or more redundant farms 202, 206, and 210 may be planned pre-construction. In yet some other embodiments, one or more redundant farms 202, 206, and 210 may be added after construction of the data center is completed. In other embodiments, the configurability of the utility farm 200 and 202, the generator farm 204 and 206, and the UPS farm 208 and 210 may be provided by spaces, panels, switches and other components located at one or more pre-determined locations of a data center.

One of the goals of the flexible tier data center is a faster construction time. In some embodiments, it takes about five months to construct a flexible tier data center. The data center may be more efficient as measured by the PUE metric due to the configurability of the flexible tier data center to cater to the availability requirements of hosted applications in the flexible tier data center. For example, when the servers in the flexible tier data center are switched from hosting Yahoo! Web search to hosting Yahoo! Mail archive, the availability requirement may be reduced from Tier 4 to Tier 1 or even lower.

The flexible tier data center may be reconfigured to reduce redundancy to satisfy the lower availability requirement. Comparing to a data center with a fixed Tier availability, the configurability of a flexible tier data center may provide significant energy and other cost savings. In some embodiments, the PUE metric may be as low as 1.03 to 0.99 with onsite generation. The cost of a flexible tier data center may also be lower. In some other embodiments, the availability requirement of a flexible tier data center may be lowered due to the advancement in geographic replication of server virtualization and cloud computing, and as a result, the flexible tier data center may be reconfigured to be a lower tier data center and therefore achieve lower cost. Yet at the same time, the Flex Tier Data Center provides higher uptime and site reliability for applications that demand them.

For example, the critical Yahoo! Mail registration application may require Tier 4 availability or higher. When the Yahoo! Mail registration application is ported to the Hadoop platform which utilizes server virtualization and the geographic replication, the availability requirement for any particular data center hosting the Yahoo! Mail registration application may be lowered due to the failover mechanism built in to the server virtualization and geographic replication of the Hadoop platform. In some other embodiments, however, additional critical applications may be added to a flexible tier data center, and as a result, the data center may be reconfigured to adapt to the higher tier availability requirements. The flexible tier data center may switch on additional redundancy such as the redundant generator farms, the redundant UPS farms, and redundant server rack-mounted UPS units.

Figure 3:
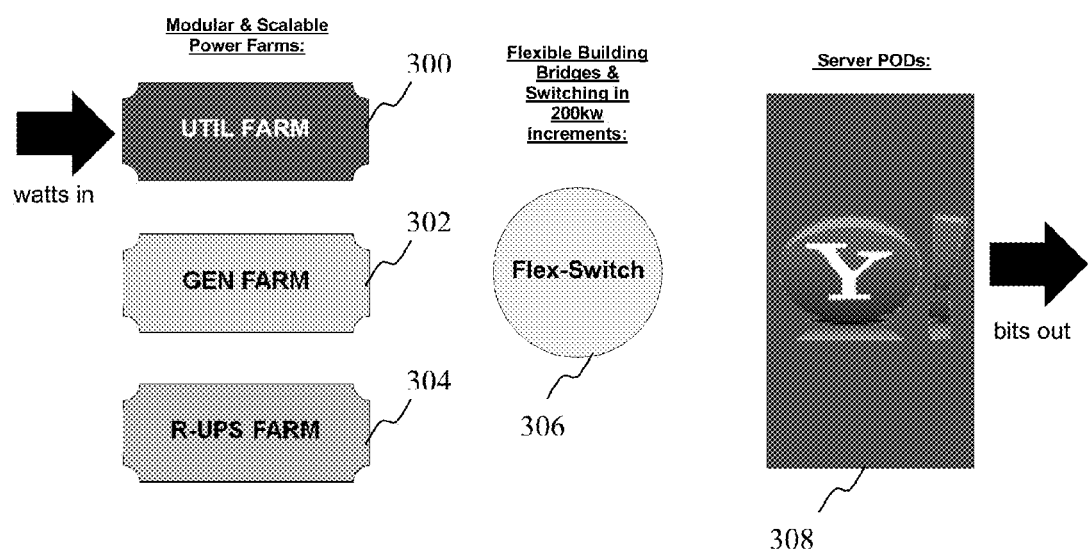
FIG. 3 is a diagram showing another example flexible tier data center.

FIG. 3 illustrates another example flexible tier data center comprising one or more electrical utility farm 300, one or more generator farm 302, one or more UPS farm 304, one or more flex-switch 306, and one or more server PODs 308. In some embodiments, a flex-switch 306 comprises flexible building bridges and switching in 200 KW increments. In other embodiments, the flex-switch 306 may be configurable and additional capacity may be added at increments such as the 200 KW increments.

In some other embodiments, the utility farm 300, the generator farm 302, and the UPS farm 304 are modular and scalable and may be reconfigured depending on the availability requirements of the applications hosted in the data center. In some other embodiments, the server POD 308 comprises two rows of server racks wherein each row comprises six or twelve server racks mounted together. The space between the two rows of the server racks may be encapsulated to provide cooling space or heat exhaustion space for the servers and other equipment placed on the server racks. In yet other embodiments, the server POD 308 may be one or more rows of server racks in a data center; servers and other equipment are placed on the server racks. The server racks may be connected via one or more cables or electrical wires. The cables may be located on top of the rows of the servers. In one embodiment, the cables may be located underneath the server racks. In another embodiments, the cables may be located in a cable management system in the flexible tier data center.

Figure 4:
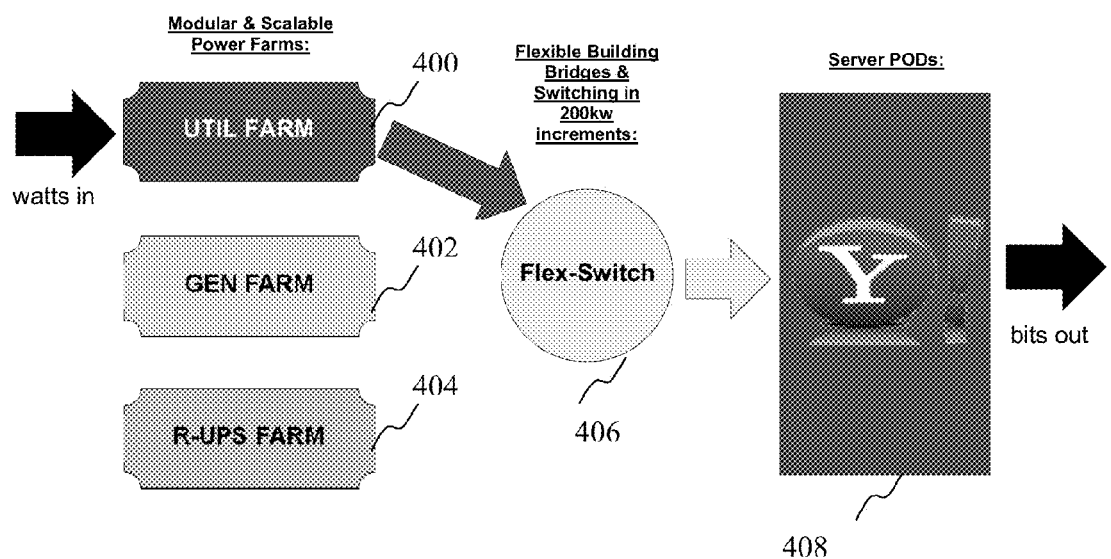
FIG. 4 is a diagram showing another example flexible tier data center with conditioned utility only functionality.

FIG. 4 illustrates another example flexible tier data center with conditioned utility only functionality comprising one or more electrical utility farm 400, one or more generator farm 402, one or more UPS farm 404, one or more flex-switch 406, and one or more server PODs 408. In one embodiment, the electrical power from the utility farm 400 is conditioned and supplied to the server PODs 408 through the flex-switch 406. The single path without redundancy may satisfy a Tier 1 availability requirement. A Tier 1 data center is composed of a single path for power and cooling distribution, without redundant components. Since only conditioned utility power is used in the embodiment, a Tier 1 data center may be constructed and used. In some other embodiments, to provide additional redundancy, however, the flex-switch 406 may be configured to connect redundant generators and UPS systems.

Figure 5:
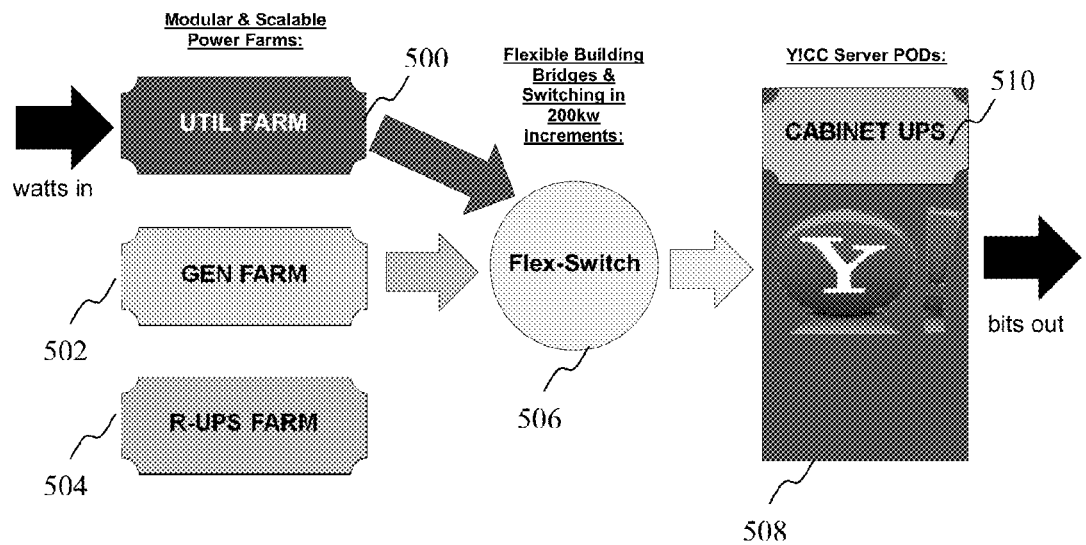
FIG. 5 is a diagram showing an example flexible tier data center with N UPS and redundant generator functionality.

FIG. 5 illustrates an example flexible tier data center with N UPS and redundant generator functionality comprising one or more electrical utility farm 500, one or more generator farm 502, one or more UPS farm 504, one or more flex-switch 506, one or more server PODs 508, and a rack-mounted UPS 510 coupled with the server PODs 508. A rack-mounted UPS is also referred to as a cabinet UPS. In one embodiment, the generator farm 502 provides redundancy for the electrical utility farm 500. The rack-mounted UPS 510 provides uninterruptible power supply to the servers and other equipment placed on the server racks. The flex-switch 506 is configured so that both the utility farm 500 and the generator farm 502 are connected to the server PODs 508. In some embodiments, the flex-switch 506 comprises flexible building bridges and switching in 200 KW increments.

As the capacity of the server PODs 508 increases, additional utility farms and additional generator farms may be connected to the flex-switch 506 via the 200 KW increments. The expandability gives the flexibility to increase power load as the application need increases without having to build the idle power capacity up front. In some other embodiments, the flex switch 506 may be configured to reduce the power load in 200 KW increments when the power load of the server PODs 508 decreases. If some of the utility farms and the generator farms are no longer needed, the flex-switch 506 may be configured so that the extra capacity may be reduced.

Figure 6:
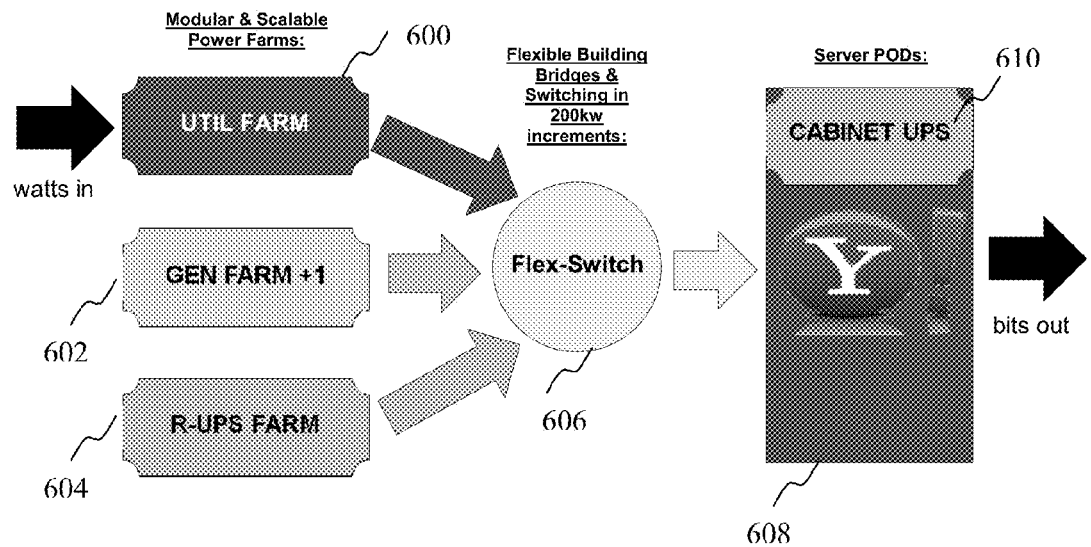
FIG. 6 is a diagram showing an example flexible tier data center with N+1 UPS and redundant generator functionality.

FIG. 6 illustrates an example flexible tier data center with N+1 UPS and redundant generator functionality comprising one or more electrical utility farm 600, one or more generator farm 602, one or more UPS farm 604, one or more flex-switch 606, one or more server PODs 608, and a rack-mounted UPS 610 coupled with the server POD 608. In one embodiment, the redundant UPS farm 604 provides redundancy to the rack-mounted UPS 610. The flex-switch 606 may be configured to connect to the redundant UPS farm 604. The rack-mounted UPS 610 provides uninterruptible power supply to the servers and other equipment placed on the server racks. The UPS system, therefore, has the N+1 redundancy in this embodiment.

Figure 7:
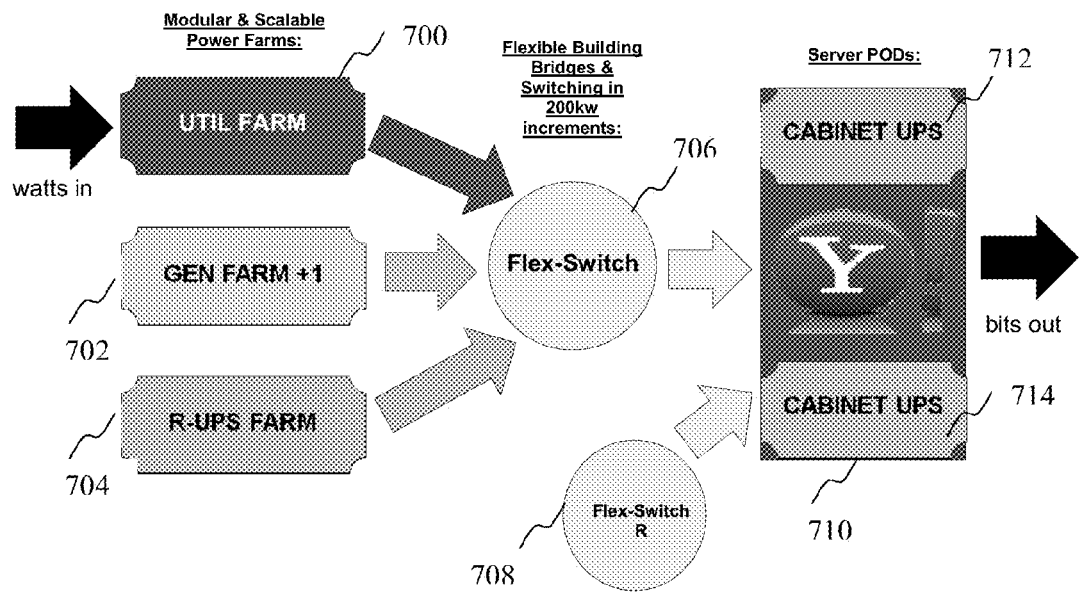
FIG. 7 is a diagram showing an example flexible tier data center with N+N+1 UPS and redundant generator functionality.
Figure 8:
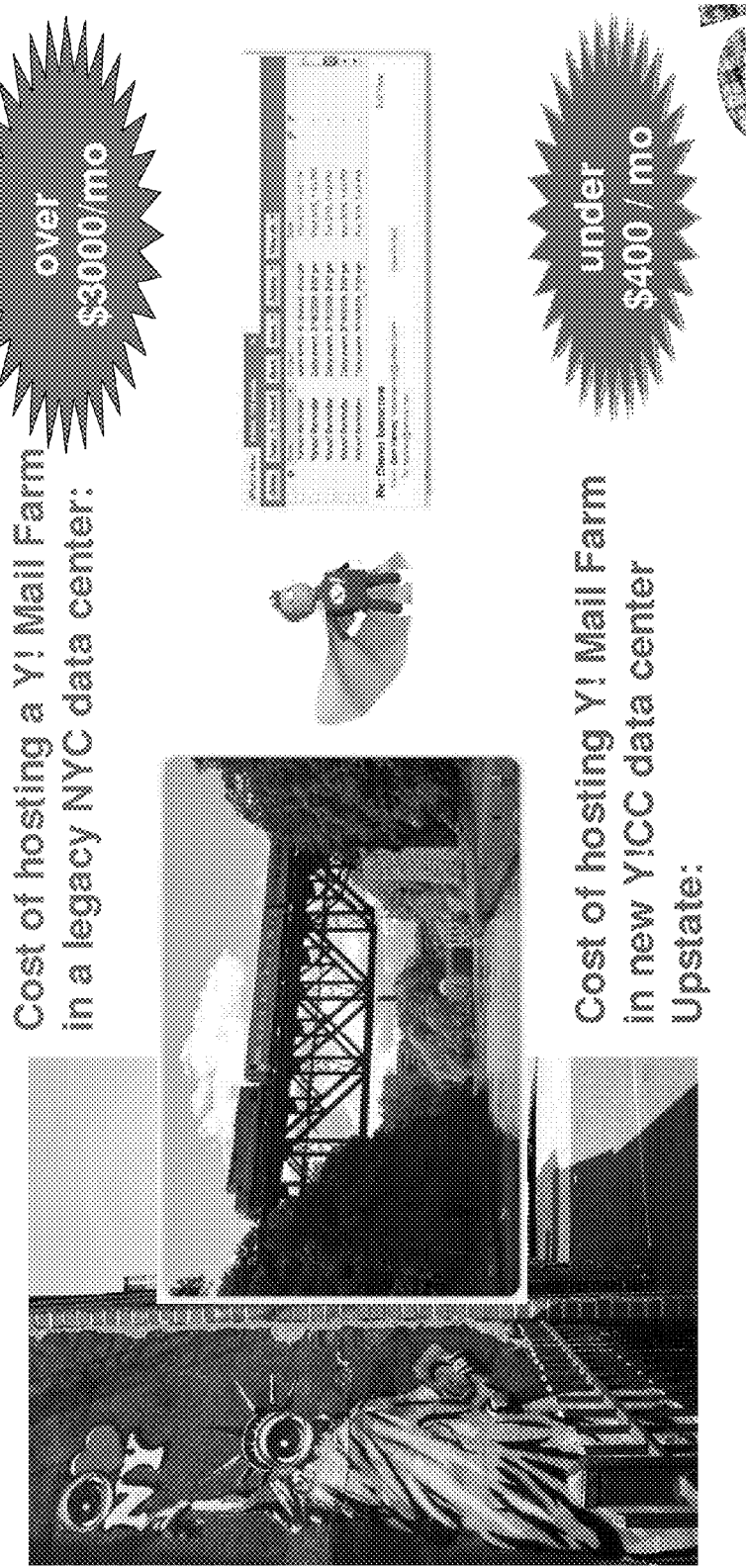
Figure 11:
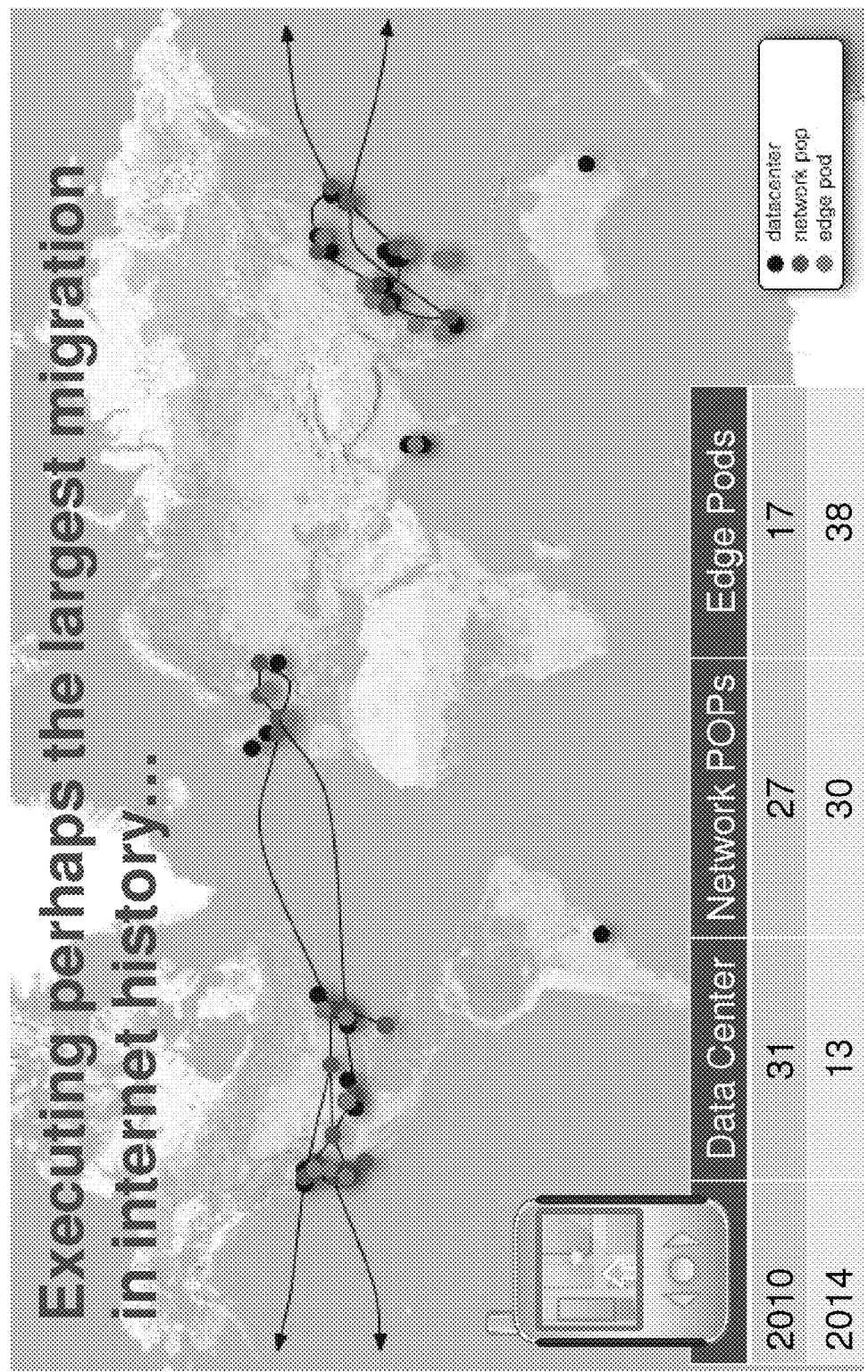
Figure 14:
Figure 16:
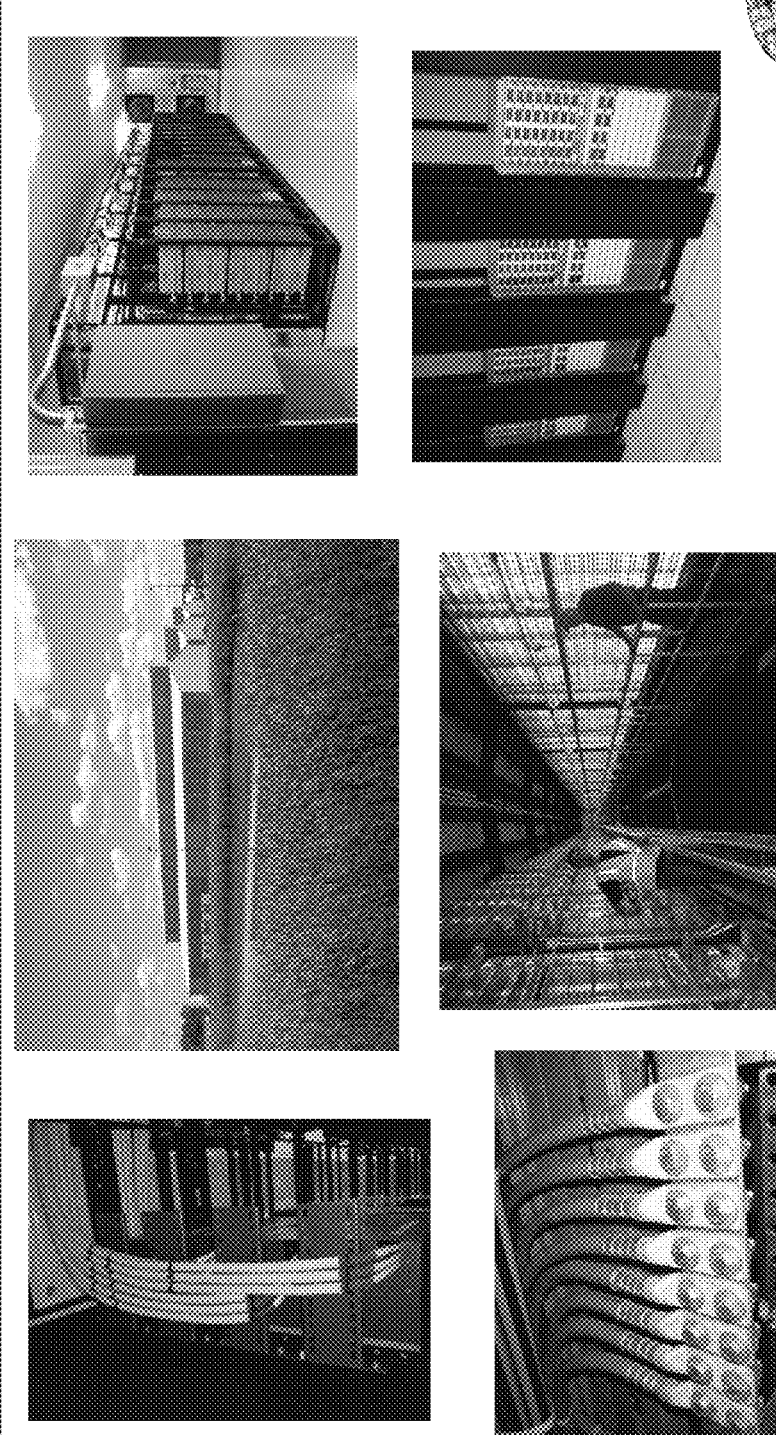
Figure 17:
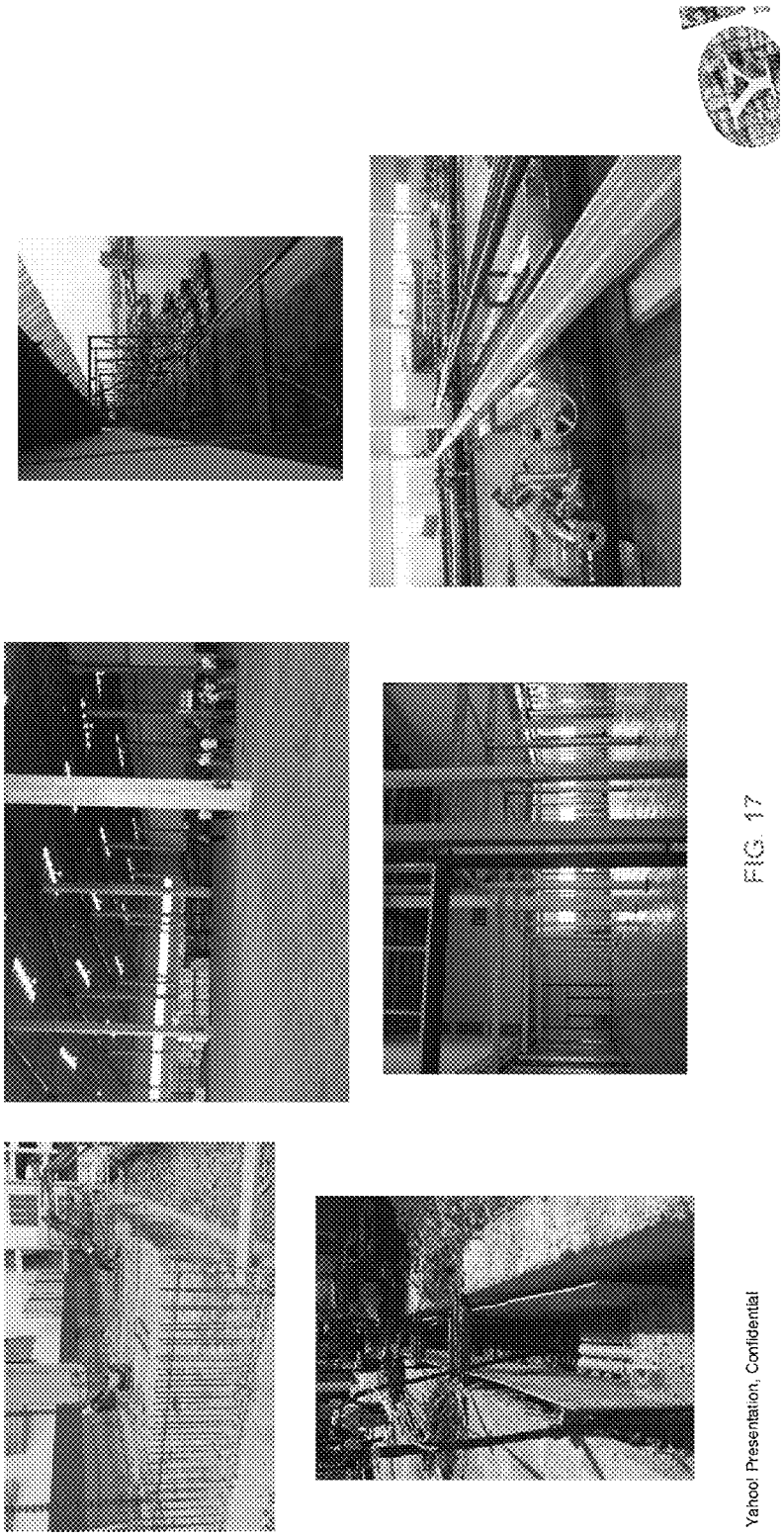
Figure 19:
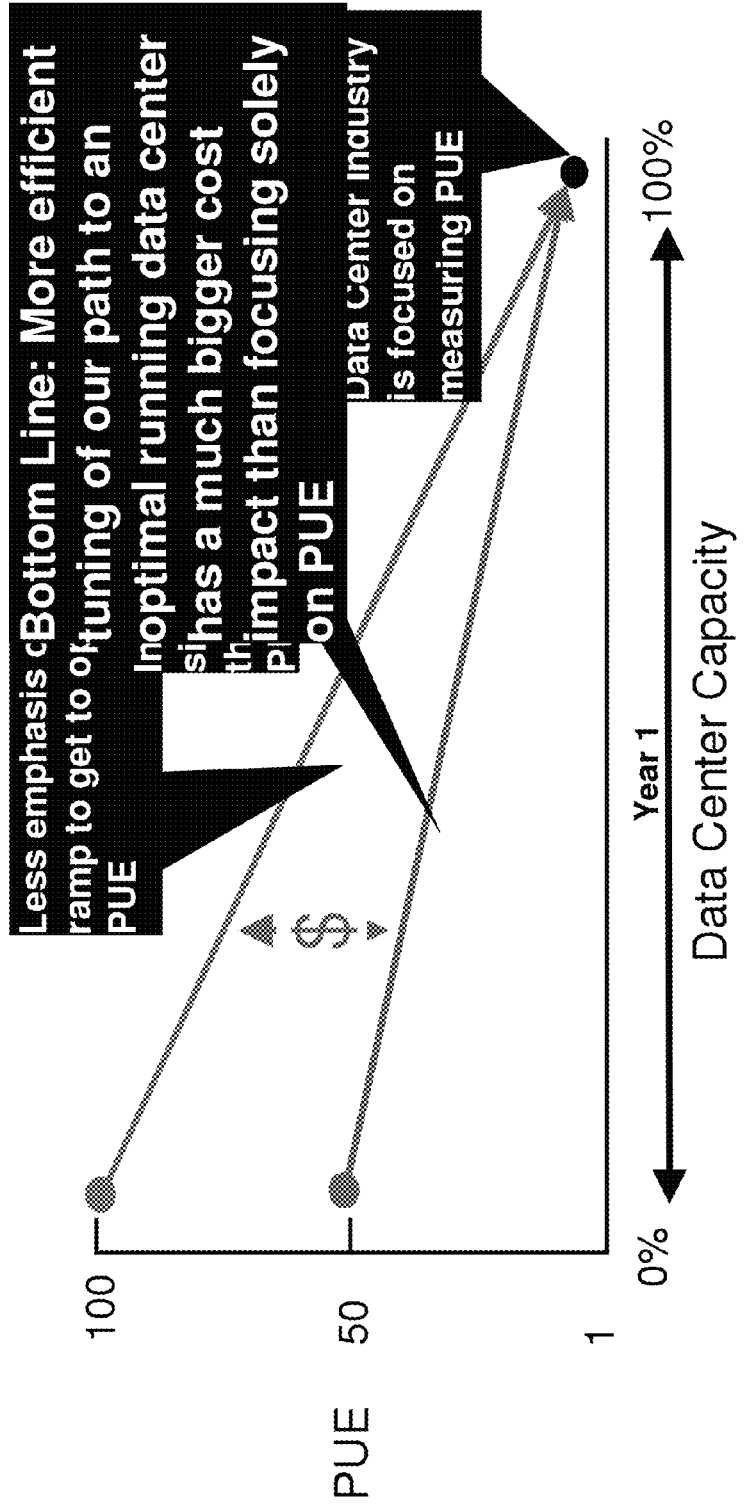
Figure 24:
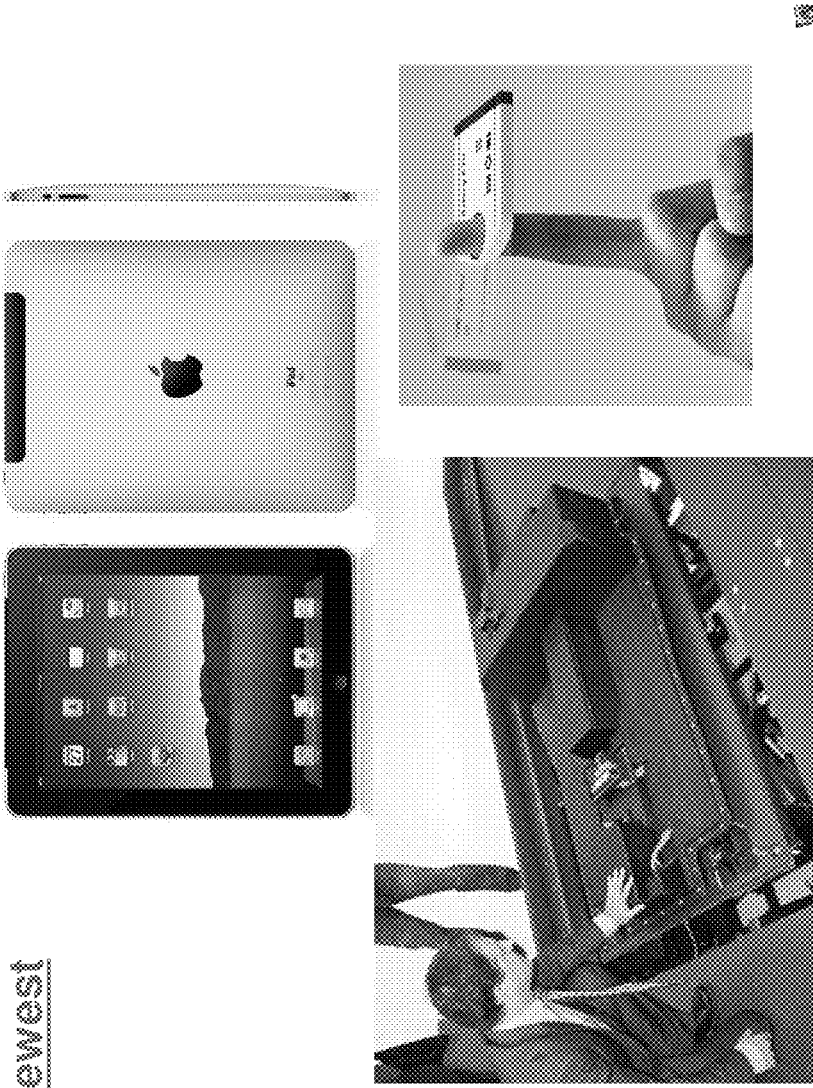
Figure 26:

FIG. 7 illustrates an example flexible tier data center with N+N+1 UPS and redundant generator functionality comprising one or more electrical utility farm 700, one or more generator farm 702, one or more UPS farm 704, one or more flex-switch 706, one or more server PODs 710, and a rack-mounted UPS 712 coupled with the server POD 710, a redundant rack-mounted UPS 714 coupled to the server POD 710, and a redundant flex-switch 708. In one embodiment, the flex-switch 706 may be configured to connect to the redundant UPS farm 704. The generator farm 702 provides redundancy for the electrical utility farm 700. The redundant UPS farm 704 provides redundancy to the rack-mounted UPS 710.

The redundant rack-mounted UPS 714 provides an additional level of redundancy of UPS. The rack-mounted UPS 712 and the rack-mounted UPS 714 provides uninterruptible power supply to the servers and other equipment placed on the server racks. The redundant UPS farm 704, the rack-mounted UPS 712 and the additional rack-mounted UPS 714 provides the N+N+1 UPS. In some other embodiments, a redundant flex-switch 708 is used to provide redundancy to the flex-switch 708. If there is a failure of the flex-switch 706, the redundant flex-switch 708 will be able to provide the flexible switching. In another embodiment, the rack-mounted UPS 714 provides the first level of redundancy for the rack-mounted UPS 712. If both fail, the redundant UPS farm 704 will be able to provide uninterruptible power supply to the server PODs 701 through the flex-switch 706 or 708.

The present invention has been explained with reference to specific embodiments. For example, while embodiments of the present invention have been described with reference to specific components and configurations, those skilled in the art will appreciate that different combination of components and configurations may also be used. Other embodiments will be evident to those of ordinary skill in the art. It is therefore not intended that the present invention be limited, except as indicated by the appended claims.

We claim:
1. A server cooling system comprising:
   an inside space defined by a floor, one or more lateral walls, and a roof;
   a flex-switch comprising one or more flexible building bridges;
   one or more utility farms coupled with the flex-switch;

a PDU (power distribution unit) operably connected to the flex-switch; and a server POD, installed in the inside space, comprising one or more racks operably connected to the PDU;

wherein after construction of the server cooling system, the flex-switch is modified so that the flex-switch is coupled with additional utility farms, one or more generator farms, and one or more UPS (uninterruptible power supply) farms via one or more components of the flex-switch responsive to determining, via a processor, a change to the server POD corresponding to a change from hosting a first application requiring availability of a first tier data center that the one or more utility farms are determined to be sufficient to handle to hosting a second application requiring availability of a second tier data center that the one or more utility farms combined with the additional utility farms, the one or more generator farms, and the one or more UPS farms are determined to be sufficient to handle.

2. The server cooling system of claim 1, wherein the one or more flexible building bridges switch power in a fixed power increment.

3. The server cooling system of claim 2, wherein the one or more flexible building bridges switch power in a fixed power increment of 200 KW.

4. The server cooling system of claim 1, wherein the one or more flexible building bridges switch power in variable power increments.

5. The server cooling system of claim 1, wherein the first tier data center is a Tier 1 data center and the second tier data center is a Tier 2 data center, a Tier 3 data center or a Tier 4 data center.

6. A server cooling system comprising:
an inside space defined by a floor, one or more lateral walls, and a roof;
a flex-switch comprising one or more flexible building bridges;
one or more utility farms coupled with the flex-switch;
one or more generator farms coupled with the flex-switch; and
a server POD, installed in the inside space and coupled with the flex-switch and a cabinet UPS, comprising one or more racks operably connected to the cabinet UPS;
wherein after construction of the server cooling system, the flex-switch is modified so that the flex-switch is electrically coupled with additional utility farms, additional generator farms, and one or more UPS farms responsive to determining, via a processor, a change to the server POD corresponding to a change from hosting a first application requiring availability of a first tier data center that the one or more utility farms and the one or more generator farms are determined to be sufficient to handle to hosting a second application requiring availability of a second tier data center that the one or more utility farms and the one or more generator farms combined with the additional utility farms, the additional generator farms, and the one or more UPS farms are determined to be sufficient to handle.

7. The server cooling system of claim 6, wherein the one or more flexible building bridges switch power in a fixed power increment.

8. The server cooling system of claim 7, wherein the one or more flexible building bridges switch power in a fixed power increment of 200 KW.

9. The server cooling system of claim 6, wherein the one or more flexible building bridges switch power in variable power increments.

10. The server cooling system of claim 6, wherein the first tier data center is a Tier 1 data center and the second tier data center is a Tier 2 data center, a Tier 3 data center or a Tier 4 data center.

11. A data center comprising:
an inside space defined by a floor, one or more lateral walls, and a roof;
a flex-switch comprising one or more flexible building bridges;
one or more utility farms coupled with the flex-switch;
one or more generator farms coupled with the flex-switch;
one or more UPS farms coupled with the flex-switch; and
a server POD installed in the inside space and coupled with the flex-switch and a cabinet UPS, comprising one or more racks operably connected to the cabinet UPS;
wherein after construction of the data center, the flex-switch is modified so that the flex-switch is coupled with additional utility farms, additional generator farms, and additional UPS farms responsive to determining, via a processor, a change to the server POD corresponding to a change from hosting a first application requiring availability of a first tier data center that the one or more utility farms, the one or more generator farms and the one or more UPS farms are determined to be sufficient to handle to hosting a second application requiring availability of a second tier data center that the one or more utility farms, the one or more generator farms and the one or more UPS farms combined with the additional utility farms, the additional generator farms, and the additional UPS farms are determined to be sufficient to handle.

12. The data center of claim 11, wherein the one or more flexible building bridges switch power in a fixed power increment.

13. The data center of claim 12, wherein the one or more flexible building bridges switch power in a fixed power increment of 200 KW.

14. The data center of claim 11, wherein the one or more flexible building bridges switch power in variable power increments.

15. The data center of claim 11, wherein the first tier data center is a Tier 2 data center and the second tier data center is a Tier 3 data center or a Tier 4 data center.

16. A server cooling system comprising:
an inside space defined by a floor, one or more lateral walls, and a roof;
a flex-switch comprising one or more flexible building bridges;
one or more utility farms coupled with the flex-switch;
one or more generator farms coupled with the flex-switch;
one or more UPS farms coupled with the flex-switch;
a redundant flex-switch comprising one or more flexible building bridges and coupled with the utility farms, the generator farms, and the UPS farms; and
a server POD installed in the inside space and coupled with the flex-switch, the redundant flex-switch and a cabinet UPS, comprising one or more racks operably connected to the cabinet UPS;
wherein after construction of the server cooling system, the flex-switch is scalable to be coupled with additional utility farms, additional generator farms, and additional UPS farms responsive to determining, via a processor, a change to the server POD corresponding to a change from hosting a first application requiring availability of a first tier data center that the one or more utility farms, the one or more generator farms and the one or more UPS farms are determined to be sufficient to handle to hosting a second application requiring availability of a second tier data center that the one or more utility farms, the one or more generator farms and the one or more UPS farms combined with the additional utility farms, the additional generator farms, and the additional UPS farms are determined to be sufficient to handle; and wherein after construction of the server cooling system, the redundant flex-switch is modified so that the redundant flex-switch is coupled with the additional utility farms, the additional generator farms, and the additional UPS farms responsive to determining, via the processor, the change to the server POD and the failure of the flex-switch.

17. The server cooling system of claim 16, wherein the one or more flexible building bridges switch power in a fixed power increment.

18. The server cooling system of claim 17, wherein the one or more flexible building bridges switch power in a fixed power increment of 200 KW.

19. The server cooling system of claim 16, wherein the one or more flexible building bridges switch power in variable power increments.

20. The server cooling system of claim 16, wherein the first tier data center is a Tier 3 data center and the second tier data center is a Tier 4 data center.

* * * * *